US011742539B2

(12) United States Patent
King et al.

(10) Patent No.: US 11,742,539 B2
(45) Date of Patent: Aug. 29, 2023

(54) SYSTEMS AND METHODS FOR BATTERY TAB COOLING

(71) Applicant: Romeo Power, Inc., Vernon, CA (US)

(72) Inventors: Cecilia Qian Wang King, Los Angeles, CA (US); Zonghao Liu, Irvine, CA (US); Prahit Dubey, Los Angeles, CA (US); Robert Wesley Thibault, Santa Monica, CA (US); Abdul-Kader El Srouji, Los Angeles, CA (US)

(73) Assignee: Romeo Power, Inc., Vernon, CA (US)

( * ) Notice: Subject to any disclaimer, the term of this patent is extended or adjusted under 35 U.S.C. 154(b) by 2 days.

(21) Appl. No.: 17/466,896

(22) Filed: Sep. 3, 2021

(65) Prior Publication Data
US 2022/0077523 A1    Mar. 10, 2022

Related U.S. Application Data

(60) Provisional application No. 63/075,058, filed on Sep. 4, 2020.

(51) Int. Cl.
| | |
|---|---|
| *H01M 10/6569* | (2014.01) |
| *H01M 10/613* | (2014.01) |
| *H01M 50/105* | (2021.01) |
| *H01M 50/178* | (2021.01) |
| *H01M 10/647* | (2014.01) |
| *H01M 10/6556* | (2014.01) |
| *H01M 50/211* | (2021.01) |
| *H01M 50/553* | (2021.01) |

(52) U.S. Cl.
CPC ..... *H01M 10/6569* (2015.04); *H01M 10/613* (2015.04); *H01M 50/105* (2021.01); *H01M 50/178* (2021.01); *H01M 50/553* (2021.01)

(58) Field of Classification Search
CPC ........... H01M 10/6569; H01M 10/613; H01M 10/647; H01M 10/6551; H01M 10/6556
See application file for complete search history.

(56) References Cited

U.S. PATENT DOCUMENTS

| | | | |
|---|---|---|---|
| 2005/0174092 A1* | 8/2005 | Dougherty | H01M 50/51 320/128 |
| 2010/0104935 A1* | 4/2010 | Hermann | H01M 10/663 429/153 |
| 2016/0359211 A1 | 12/2016 | Kenney et al. | |
| 2017/0309878 A1* | 10/2017 | Kepler | H01M 50/20 |

(Continued)

OTHER PUBLICATIONS

International Search Report and Written Opinion dated Dec. 15, 2021 in PCT International Patent Application No. PCT/US2021/49101.

*Primary Examiner* — Ula C Ruddock
*Assistant Examiner* — Amanda Rosenbaum
(74) *Attorney, Agent, or Firm* — Snell & Wilmer L.L.P.

(57) ABSTRACT

Systems and methods for a battery pack are disclosed. A battery pack tab cooling system is disclosed that includes a pouch cell comprising a first tab and a second tab. The battery pack tab cooling system also includes an enclosure configured to contain a cooling material. The first tab and the second tab extend from the pouch cell into the enclosure and are in contact with the cooling material. A method of manufacturing a battery pack that includes forming the battery pack, the battery pack comprising and cooling the at least one of the first tab and the second tab to cool the pouch cell.

5 Claims, 17 Drawing Sheets

(56) References Cited

U.S. PATENT DOCUMENTS

| | | | |
|---|---|---|---|
| 2018/0047518 A1* | 2/2018 | Kuboki | H01M 10/617 |
| 2018/0062229 A1 | 3/2018 | Jeong | |
| 2018/0233791 A1 | 8/2018 | Tong et al. | |
| 2020/0028224 A1* | 1/2020 | Hofer | H01M 10/613 |
| 2020/0136208 A1* | 4/2020 | Qiu | H01M 10/613 |
| 2021/0376409 A1* | 12/2021 | Zhamu | H01M 10/654 |

* cited by examiner

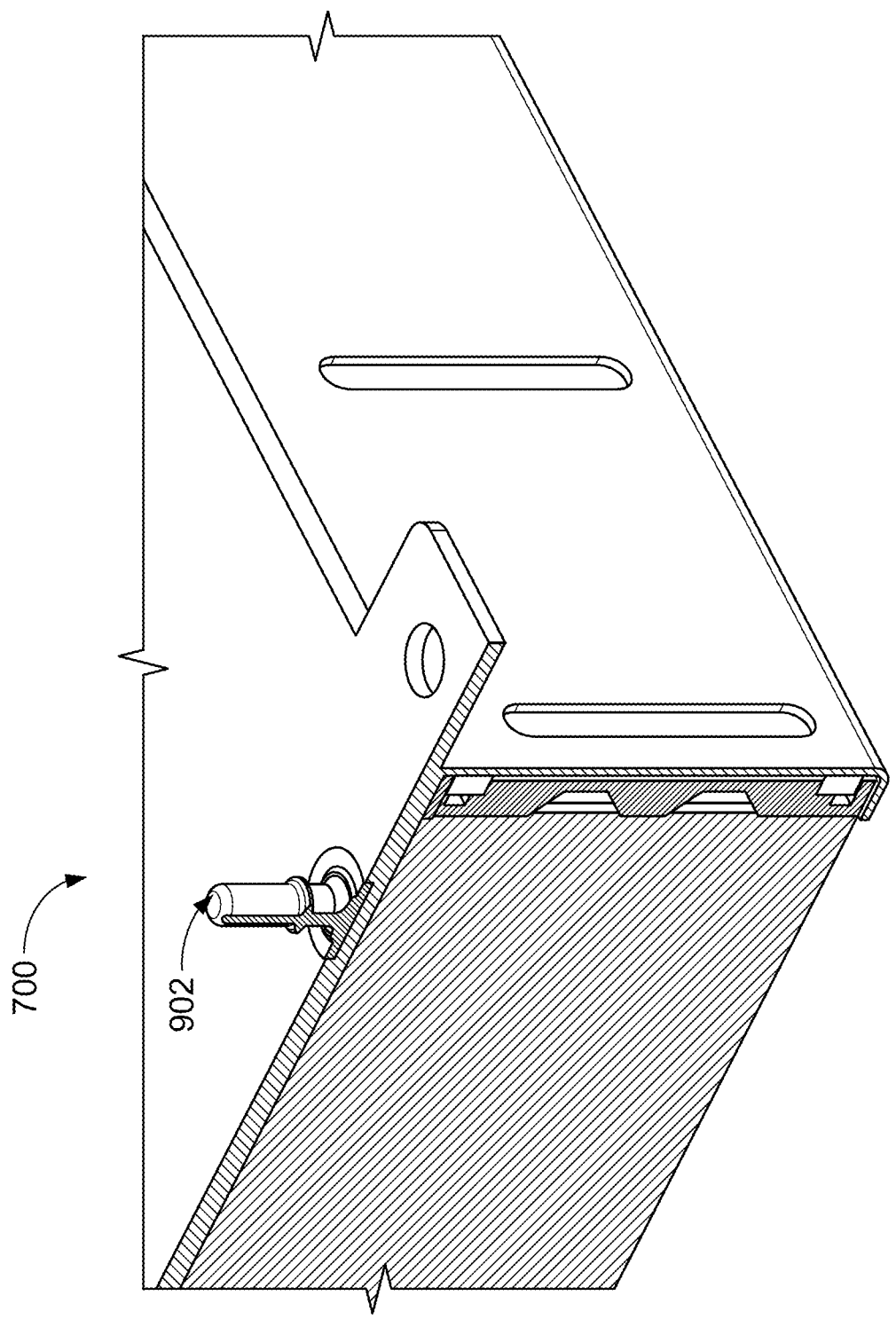

SYSTEMS AND METHODS FOR BATTERY TAB COOLING

CROSS-REFERENCE TO RELATED APPLICATIONS

This application claims priority to, and the benefit of, U.S. Provisional Application Ser. No. 63/075,058 filed on Sep. 4, 2020, entitled "SYSTEMS AND METHODS FOR BATTERY TAB COOLING". The entire contents of the foregoing application are hereby incorporated by reference for all purposes.

TECHNICAL FIELD

The present disclosure relates to thermal management, and in particular to thermal management of battery packs.

BACKGROUND

Prior approaches to thermal management of battery packs and cells, particularly in vehicle applications, have attempted to provide rapid and well-controlled heating and/or cooling of battery packs as desired. However, these prior approaches have been limited in their ability to maintain battery cells within a desirable temperature range during operation, to control maximum and minimum cell temperatures, to achieve an operational setpoint temperature, to ensure a limited range of thermal variability between cells in a battery pack, or to reduce thermal gradients across the internal jelly roll layers. Accordingly, improved systems and methods for thermal management of battery packs and other electrical devices remain desirable.

SUMMARY

In an exemplary embodiment, a battery pack tab cooling system includes a pouch cell comprising a first tab and a second tab and an enclosure configured to contain a cooling material. At least one of the first tab and the second tab extend from the pouch cell into the enclosure and are in contact with the cooling material.

In another exemplary embodiment, a method of manufacturing a pouch battery includes forming the battery pack. The battery pack includes a pouch cell having a first tab and a second tab and a first enclosure, at least one of the first tab and the second tab extending from the pouch cell into the first enclosure, the first enclosure containing a first cooling material, and the at least one of the first tab and the second tab submerged within the first cooling material. The first cooling material is configured to cool the at least one of the first tab and the second tab to cool the pouch cell. The method also includes cooling the at least one of the first tab and the second tab to cool the pouch cell. In an example embodiment, the battery pack includes a second enclosure, wherein the first tab extends from the pouch cell into the first enclosure and the second tab extends from the pouch cell into the second enclosure. In this example embodiment, the first tab is submerged within the first cooling material and the second tab is submerged within a second cooling material, and wherein the first cooling material is configured to cool the first tab and the second cooling material is configured to cool the second tab.

BRIEF DESCRIPTION OF THE DRAWINGS

With reference to the following description, appended claims, and accompanying drawings:

FIGS. 9A-9D are diagrams illustrating aspect of the example battery pack of FIGS. 7 and 8.

DETAILED DESCRIPTION

Figure 1:
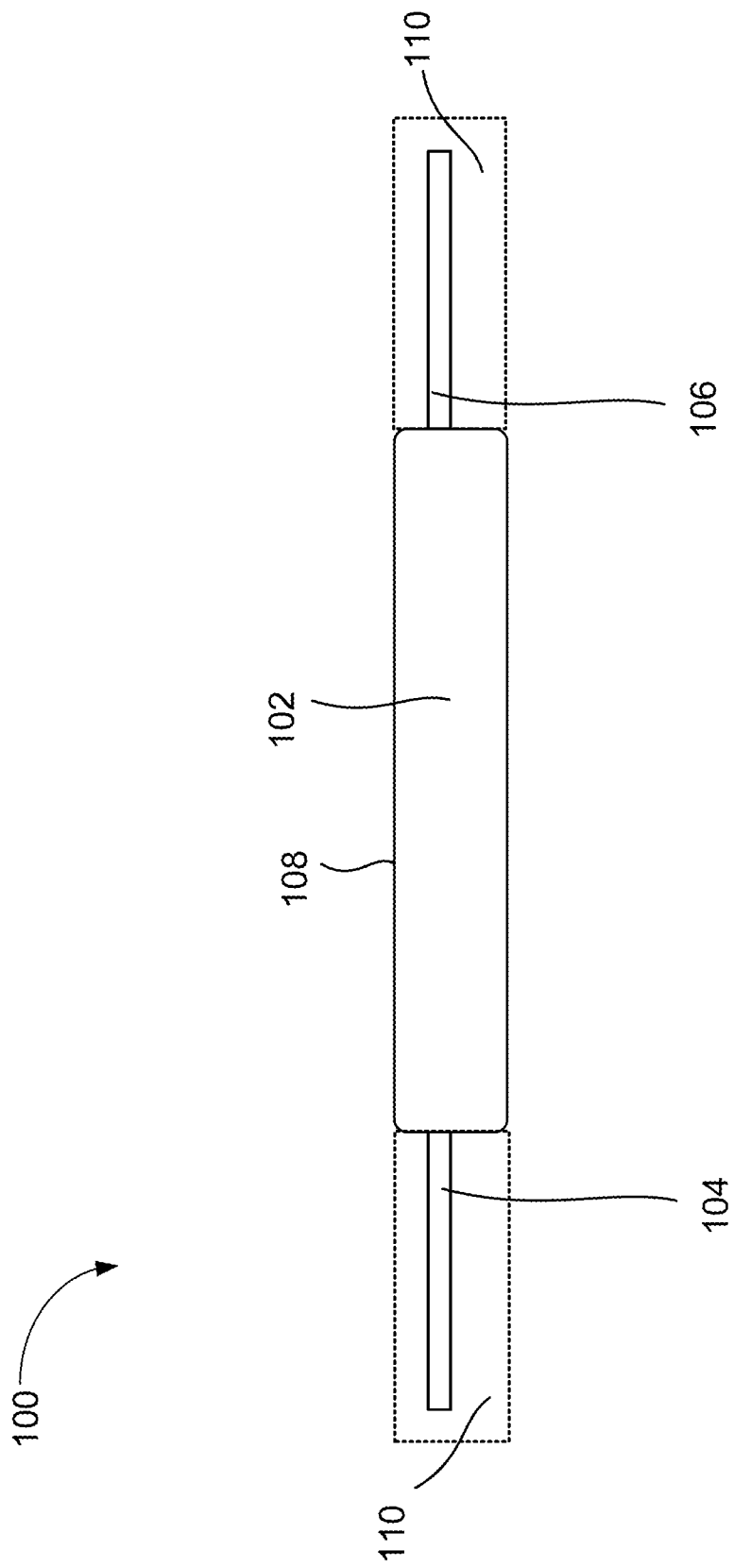
FIG. 1 is a block diagram illustrating an example tab-based cooling device in accordance with the systems and methods described herein.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended statements.

For the sake of brevity, conventional techniques for battery pack construction, configuration, and use, as well as conventional techniques for thermal management, operation, measurement, optimization, and/or control, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical system or related methods of use, for example a battery pack for an electric vehicle.

Various shortcomings of prior batteries, thermal management systems, and/or the like can be addressed by utilizing battery packs and related components configured in accordance with principles of the present disclosure. For example, prior cooling approaches may typically utilize a cold plate base, e.g., cold plate attached to a side of a cell, a front of a cell, or a back face of a cell, or a double-sided cold plate system (where the two sides of the cell—the sides opposite each other, perpendicular to the length of the cell, and in the thin direction of the cell—are sandwiched between two cold plates) particularly for pouch cells. Using cold plates alone may create a large pressure drop within the pouch cell and add a significant amount of total weight. However, in some cases, the cold plate may be placed along the thickness of the pouch cells. This may reduce cooling efficiency. This may also create inhomogeneous heat distribution across the pouch cells in a module and along the pouch cell itself resulting in higher temperature gradient across the body of the cell. Accordingly, using cold plates alone may lead to poor electrical performance and aging of the pouch cells.

In contrast, exemplary systems and methods disclosed herein enable a pouch cell having a tab submerged within a cooling material. In an example embodiment, the cooling material may be a single phase, e.g., a liquid or a vapor. In another example embodiment, the cooling material may transform from the liquid to the vapor to provide two-phase cooling.

In an example embodiment, a pouch cell tab cooling system is disclosed. The pouch cell tab cooling system may comprise a pouch cell comprising a jelly roll, a pouch case encapsulating the jelly roll, and tabs coupled to the jelly roll. Although the pouch cell herein is described in the context of a pouch cell comprising a jelly roll, the pouch cell may comprise any battery or cell structure that has tabs connected to the internal components of the pouch cell. In an example embodiment, the pouch cell tab cooling system may be configured to submerge the tabs within a cooling material (or otherwise wet the tabs) and to cool the jelly roll by cooling the tabs with the cooling material. In an example, the tabs are each configured to carry electrical current. For example, for a given pouch cell, one tab may correspond to a positive terminal of the pouch cell and another tab may correspond to a negative terminal of the pouch cell.

In an example embodiment, the pouch cell tab cooling, compared to traditional surface cooling of pouch cells, is configured to have a smaller thermal gradient across the internal jelly roll layers and may achieve longer cycle life for the pouch cell. Moreover, the pouch cell tab cooling system, compared to traditional surface cooling of pouch cells, is configured to reduce system weight while achieving better thermal management by only cooling the tab portion or tabs and top side of a module of pouch cells.

In an example embodiment, a cold plate may cover a top portion of the pouch cells and extend out over the top of the tab enclosure. Generally, the cold plate may be used with an example where the tabs are cooled by vaporization of the cooling liquid. For example, the vapor may be condensed by the portion of the cold plate extending over the top of the tab enclosure. Submerged cooling generally does not use a cold plate.

FIG. 1 is a block diagram illustrating an example tab-based cooling device in accordance with the systems and methods described herein. In accordance with various example embodiments, a tab-based cooling system 100 may comprise a pouch cell 102 and a cooling system for providing a cooling fluid to the tabs 104, 106 of the pouch cell 102. The pouch cell 102 may include a pouch 108, an anode tab 104 and a cathode tab 106.

The pouch cell 102 may have any suitable battery chemistry. For example, the pouch cell 102 may be a lithium-ion cell, such as lithium cobalt oxide, lithium manganese oxide, lithium nickel manganese cobalt oxide, lithium iron phosphate, lithium nickel cobalt aluminum oxide, lithium titanate, other lithium-based battery chemistries, or other battery chemistries.

Fluid may be provided to the tabs 104, 106. The tabs 104, 106 may be enclosed in tab enclosure 110 that encompasses all or a portion of the tabs 104, 106 and contains the cooling fluid. In one embodiment, for a cell with tabs on one end, a single enclosure can be used. In another embodiment, for cells having tabs on opposite ends two separate enclosures can be used to encompass the tabs. The tab enclosure 110 may be configured to hold the cooling fluid in contact with the tabs 104, 106.

The tabs 104, 106 are wetted or submerged within the tab enclosure 110. Accordingly, the tabs 104, 106 may be cooled within the tab enclosure 110 by the cooling fluid. In an example embodiment, the cooling fluid may be pump fed from a reservoir.

The fluid may be any fluid that may carry heat away from the tabs 104, 106 to other parts of the system. In one example, the cooling fluid may be a liquid, such as a di-electric fluid with one or more additives. For example, the additive or additives may be chemicals to control freezing, chemicals to protect materials from corrosion, or chemicals to both control freezing and protect materials from corrosion. In one example embodiment, the di-electric fluid may be selected to provide a dielectric strength of between 25 kV to 75 kV DC, or higher, as measured based on IEC60156. However, any suitable di-electric fluid may be used. In an example embodiment, the cooling fluid may be a liquid such as an Ester, Fluorinated Hydrocarbon, Silicone Oil, Mineral Oil, Hydrofluorocarbons, Hydrochlorofluorocarbons, Perfluoropolyethers, Hydronfluoroolefin, or any other common refrigerants and/or dielectric fluids with one or more additives.

Figure 2:
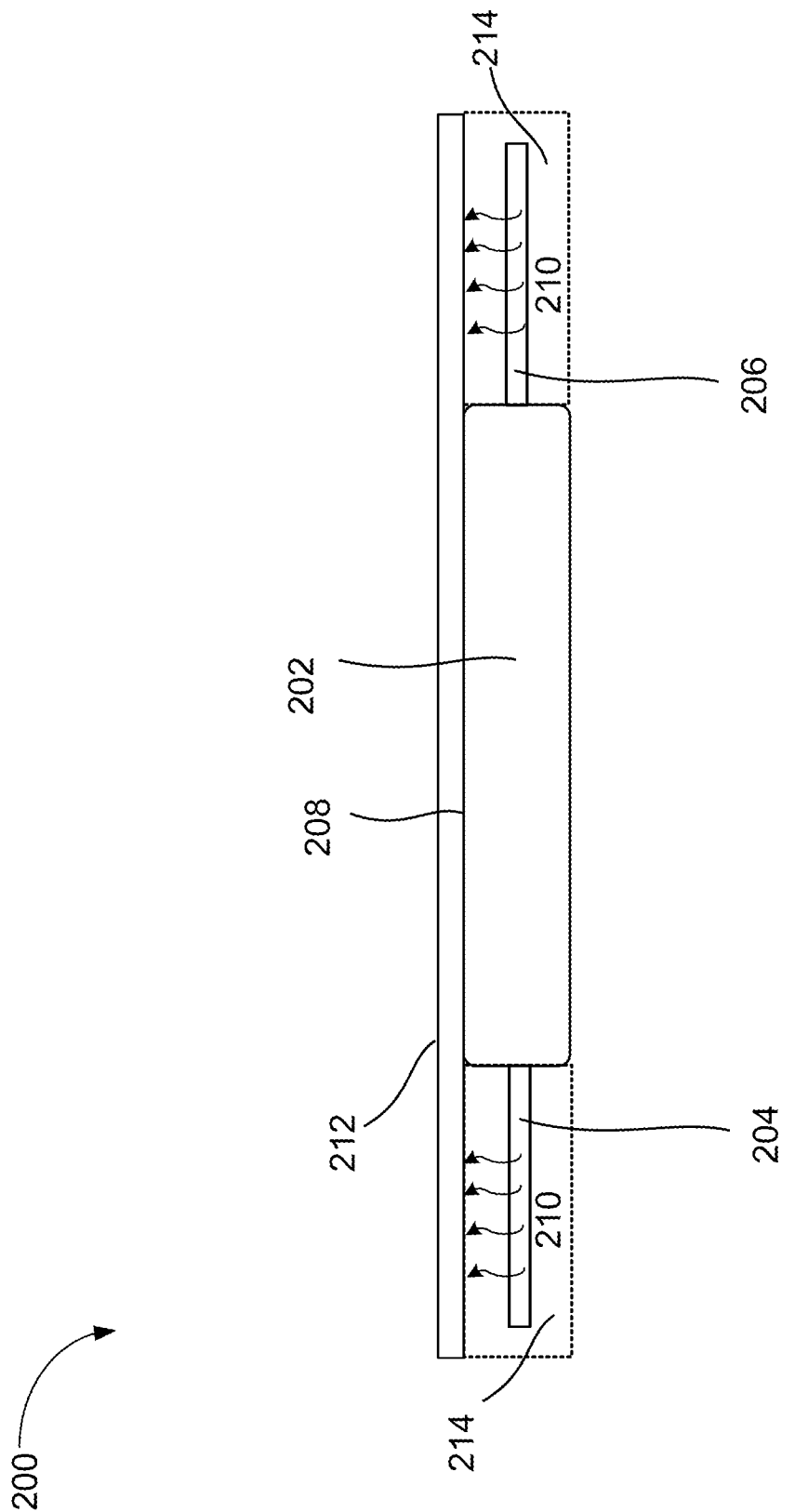
FIG. 2 is a block diagram illustrating another example tab-based cooling device in accordance with the systems and methods described herein.

The cooling fluid may, for example, be a liquid. In some examples, the cooling fluid may transition between a liquid and a gas within the system. A transition from a liquid to a gas, having a property called latent heat of vaporization, may generally be endothermic and may help transfer heat away from the tabs 104, 106 to a cold plate that is configured to dissipate heat. Although not shown, the example of FIG. 1 may further comprise a cooling plate as shown in FIG. 2. An example that includes a transition between a liquid and a gas is discussed in more detail in FIG. 2. The cooling fluid may be any suitable liquid for transferring heat. In an example embodiment, the cooling fluid is compatible with all of the dissimilar materials it comes in contact with. In an example embodiment, where the cooling fluid is intended for two-phase cooling, the cooling fluid may be configured to achieve a desirable boiling temperature at a desired pressure. For example, a two phase cooling fluid may be configured to achieve boiling at 45 degrees C. at 1 atmosphere pressure. In another example embodiment, the cooling fluid is any refrigerant with a boiling point greater than 40 degrees C., greater than 60 degrees C., or the like at one atmosphere of pressure. However, the two phase cooling fluid may have any suitable designed boiling temperature/pressure qualities. In one example embodiment, the cooling fluid has a Novec brand fluid mixture to achieve a designed boiling temperature of 45 degrees C. at 1 atmosphere pressure.

FIG. 2 is a block diagram illustrating another example tab-based cooling device 200 in accordance with the systems and methods described herein. The example tab-based cooling device 200 illustrates a transition between a liquid and a gas. Similar to FIG. 1, the tab-based cooling device 200 may comprise a pouch cell 202 and a cooling system for providing a cooling fluid to the tabs 204, 206 of the pouch cell 202. The pouch cell 202 may include a pouch 208, an anode tab 204 and a cathode tab 206. A cooling liquid may be within the cooling system, e.g., within the tab enclosure 214 indicated by the dotted lines. The cooling liquid may be heated by the tabs 204, 206. Accordingly, some portion of the cooling liquid may evaporate as indicated by the arrows 210, e.g., the evaporation may occur faster due to heating by the tabs 204, 206. The evaporating liquid may cause the tab enclosure 214 to contain a pool of the cooling liquid as well as a vapor portion. Thus, the tab enclosure 214 may also be called as a vapor chamber. As the evaporation of the cooling liquid is endothermic, the evaporation may cool the tabs 204, 206, directly or indirectly. In an example embodiment, the evaporation happens at a constant temperature helping hold the temperature constant by rapidly removing heat from the tabs. The evaporated cooling liquid indicated by the arrows 210 may condense on the top of the cooling system chamber on a cooling plate 212. Heat from the vapor may dissipate out the top and sides of the tab enclosure (or vapor chamber) 214, but mainly through cooling plate 212. Moreover, the vapor may condense due to the cooling from cooling plate 212 and the condensed cooling liquid may flow back down into the cooling liquid at the bottom of the tab enclosure (or vapor chamber) 214, e.g., due to gravity.

Figure 3:
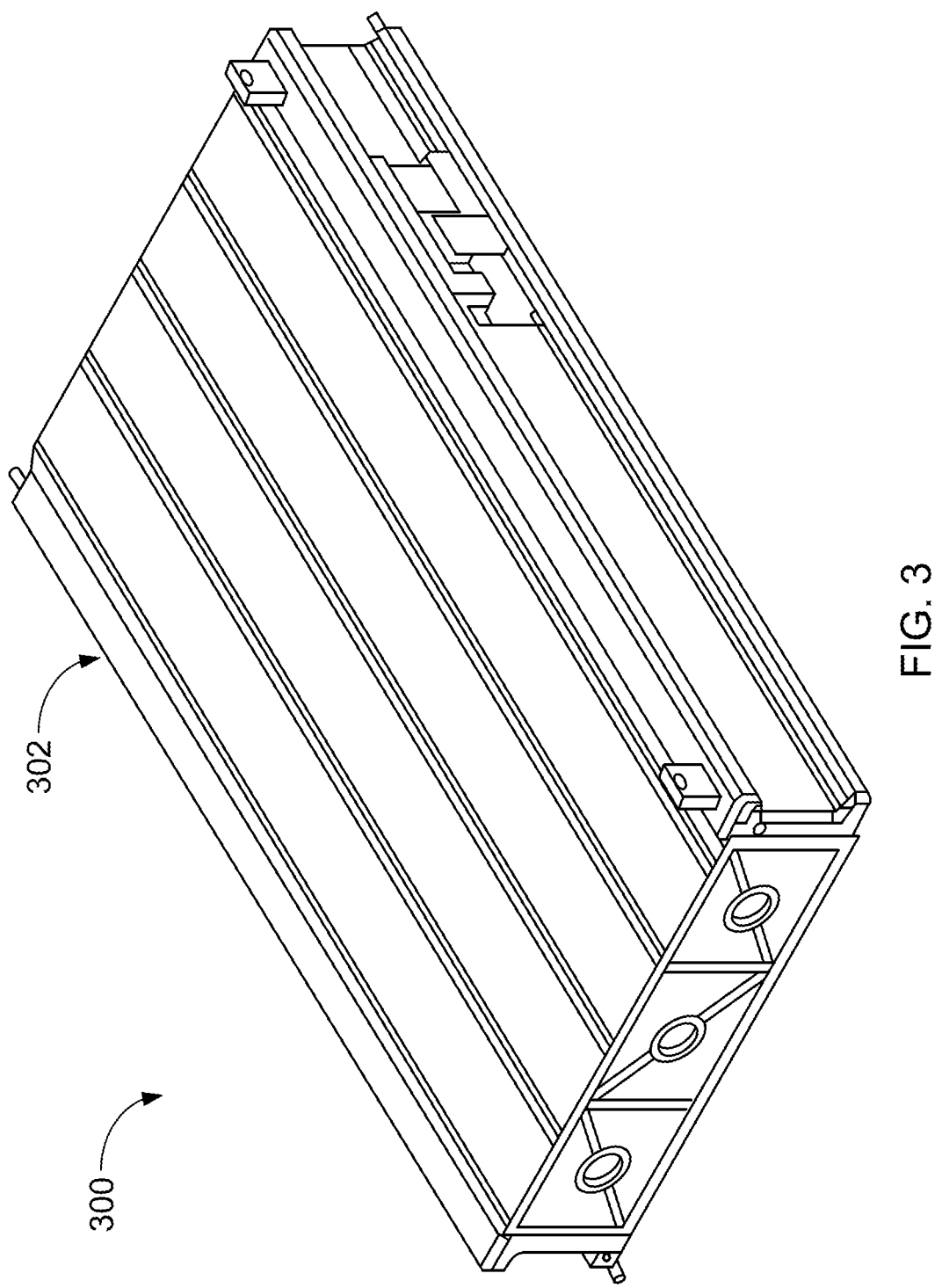
FIG. 3 is a diagram illustrating an example battery pack using submerged cooling in accordance with the systems and methods described herein.
Figure 4:
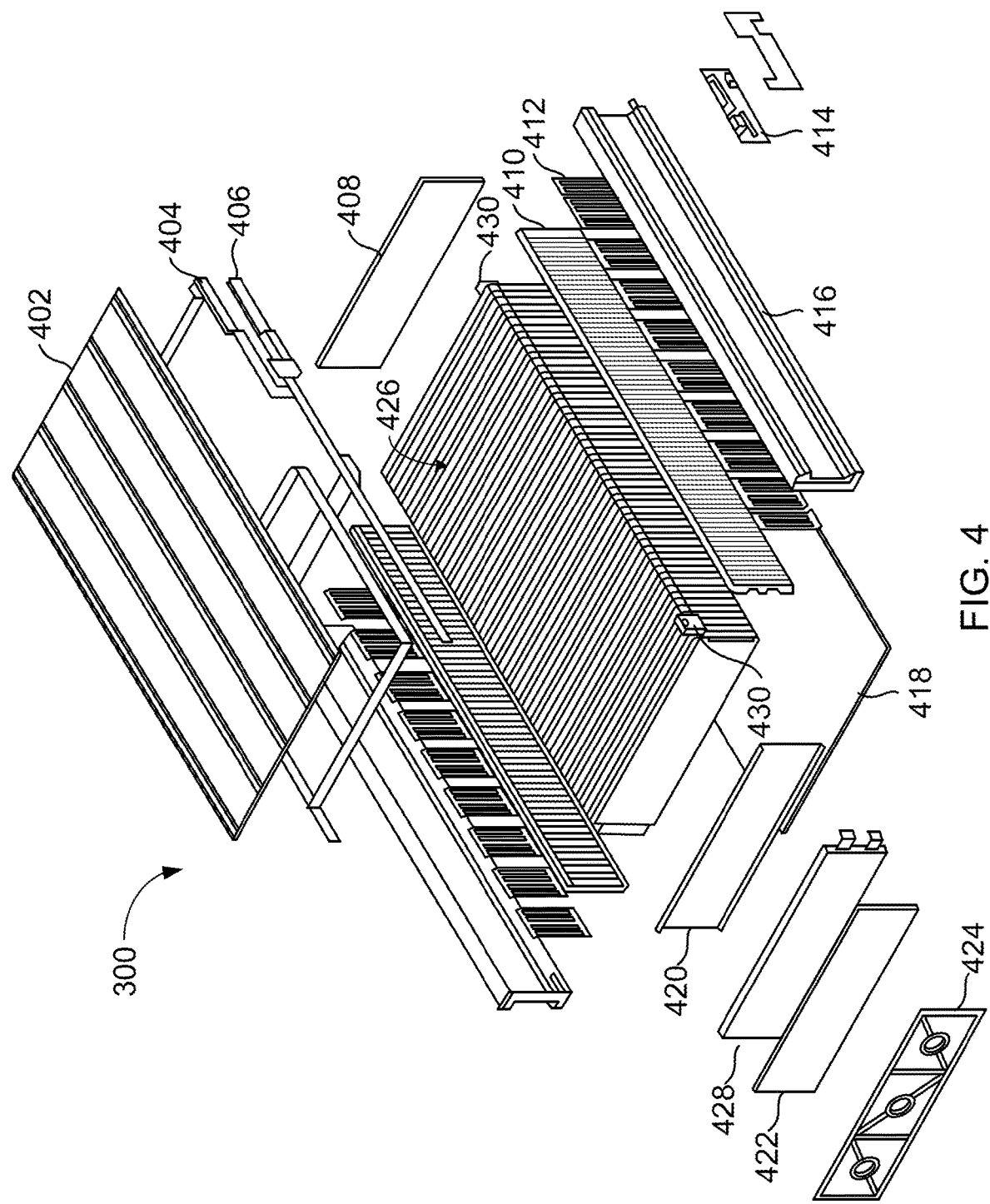
FIG. 4 is a diagram illustrating an exploded view of the example battery pack of FIG. 3.

FIG. 3 is a diagram illustrating an example battery pack 300 using submerged cooling in accordance with the systems and methods described herein. In FIG. 3 the example battery pack 300 is assembled. In an example embodiment battery pack 300 comprises a case 302. In an example embodiment, the case 302 is sealed. FIG. 4 is a diagram illustrating an exploded view of the example battery pack 300 of FIG. 3. The example battery pack 300 includes a top cover 402, a temperature sensor(s) 404, a voltage sensor(s) 406, a side cover 408, a tab alignment plate 410, a current collector 412, a Battery Monitoring Board (BMB) 414, a submerged enclosure for tabs 416, a bottom cover 418, a highly thermally conductive but electrically isolated sheet 420, a foam pad 422, a side cover 424, a pouch cell 428, and a set of bus bars 430. The battery pack 300 may include a number of cells 426. For example, the cells 426 may comprise some number, n, of combinations of pouch cells 428, thermally conductive but electrically isolated sheets 420, and foam pads 422. Some number of cells 426 together may form a module. Some number of modules together may form a pack. An example of combinations of pouch cells 428, highly thermally conductive but electrically isolated sheets 420, and foam pads 422 is discussed with respect to FIG. 5E.

The top cover 402, the side cover 408, the submerged enclosure for tabs 416, the bottom cover 418, and the side cover 424 may be made of plastic, metal, or any other suitable material. For examples that use liquid cooling, a plastic material may be used. In other examples, the enclosure for tabs 416 may typically be under low pressure or atmospheric pressure. However the enclosure for tabs 416 may operate under any suitable pressure. Thus in accordance with various example embodiments, it may be preferable to use metal to contain the cooling material under its designed operating pressure. For example, metal may be used for the vapor chamber as the overlaying cold plate is metallic as well. This may reduce overall thermal resistance for flow of heat from the tabs enclosure to the cold plate. It may be difficult, in some examples, for dissimilar materials (e.g., metal and plastics) to be joined together to seal the vapor chamber. In other examples, however, contents under pressure may be contained by a thicker plastic, e.g., as compared to plastic used to contain only a liquid coolant. The top cover 402, the side cover 408, the submerged enclosure for tabs 416, the bottom cover 418, and the side cover 424 may form the case 302 of FIG. 3. For example, edges of the top cover 402, the side cover 408, the submerged enclosure for tabs 416, the bottom cover 418, and the side cover 424 may meet and form a sealed container. More specifically, an edge of the top cover 402 may mate to an edge of one submerged enclosure for tabs 416. A second edge of the top cover 402 may mate to another edge of another submerged enclosure for tabs 416. A third edge of the top cover 402 may mate to an edge of the side cover 408. A fourth edge of the top cover 402 may mate to an edge of the side cover 424. Similarly, an edge of the bottom cover 418 may mate to an opposite edge of one submerged enclosure for tabs 416, e.g., opposite the edge that mates to the top cover. A second edge of the bottom cover 418 may mate to another opposite edge of another submerged enclosure for tabs 416. A third edge of the bottom cover 418 may mate to an opposite edge of the side cover 408. A fourth edge of the bottom cover 418 may mate to an opposite edge of the side cover 424. Edges of the side cover 408, the two submerged enclosure for tabs 416, and the side cover 424 may mate together to form the sides of the case 302.

The temperature sensor(s) 404 may be located within the case 302. The temperature sensor(s) 404 may be a thermistor, a thermocouple, resistance thermometer, a silicon bandgap temperature sensor, or other electrical temperature sensors. In an example embodiment, the temperature sensor 404 may comprise a bimetallic strip or other mechanical thermometer, provided that some way to convert the mechanical reading to an electrical signal or to provide the temperature reading outside the case 302 is provided. The temperature sensor 404 may be an integrated circuit (IC) temperature sensor. The temperature sensor 404 may generally be located anywhere within the case 302. Alternatively, the temperature sensor 404 may be located near a particularly hot part of the battery pack 300 or other part of the battery pack where a temperature reading may be desirable, or an area within the case 302 having a known temperature gradient to a particularly hot part of the battery pack 300, or other part of the battery pack where a temperature reading may be desirable. In one example embodiment, the temperature sensor(s) 404 comprise a plurality of temperature sensors to measure the temperature in a plurality of locations in the battery pack, and the sensors may be connected to a wire ribbon or the like to communicate the sensor readings to a monitor circuit or battery management system. For example, four temperature sensors may be used for each cell. However, any suitable number of temperatures sensors may be used per cell and/or per module.

The voltage sensor(s) 406 may be located within the case 302. The voltage sensor(s) 406 may be a resistive type sensor or a capacitive type sensor. The voltage sensor(s) 406 may generally be located anywhere in the case 302 as long as it is possible to route voltage signals from, for example, the bus bars 430 or other locations having a voltage to be measured, to the voltage sensor 406. In the example of FIG. 4, the voltage sensor 406 is located under the top cover 402 such that, when assembled, the voltage sensor 406 is near the bus bar 430. For example, voltage may be sensed every 1SXP configuration (containing 1*X cells, arranged as X cells connected in parallel to form a block, for forming series connection with another block) through a current collecting plate. Those that are close to module terminal busbars will be located near busbars. In one example embodiment, the voltage sensor(s) 406 comprise a plurality of voltage sensors to measure the voltage in the battery pack, and the sensors may be connected to a wire ribbon or the like to communicate the sensor readings to a monitor circuit or battery management system. For example, a voltage sensor may be used for each cell. However, any suitable number of voltage sensors may be used per module or pack.

A pair of tab alignment plates 410 may be located within the case 302, with one tab alignment plate 410 located along a side of the cells 426 and another tab alignment plate 410 located along an opposite side of the cells 426. The tab alignment plates 410 may align the tabs (e.g., such as the tabs 104, 106 of FIG. 1) from each of the cells 426. For example, the tab alignment plates 410 may also generally keep tabs parallel to each other. Additionally, the tab alignment plates 410 may separate the tabs, and may make it less likely for tabs that are not intended to touch to short together. The tab alignment plates 410 may each be between a side of the cells 426 and the current collector 412. Tab alignment plates may be made of plastic or a metal with a dielectric coating.

The current collectors 412 may be located within the case 302, with one current collector 412 located along a side of the cells 426 next to one of the tab alignment plates 410 and another current collector 412 located along the opposite side of the cells 426 next to another of the tab alignment plates 410. Accordingly, each current collector 412 may be between a tab alignment plate 410 and a submerged enclosure for tab 416.

Each current collector 412 may have an electrical connection to one or more tabs. The tabs may carry electrical current from the cell associated with each pair of tabs. Accordingly, a number of current collectors 412 may form series connections, parallel connections, or a combination of series connections and parallel connections between the cells 426. The possible series connections, parallel connections, or combination of series connections and parallel connections between the cells 426 may be selected based on the voltage needs, current needs, or both voltage and current needs for the intended purpose of the battery pack 300.

In an example embodiment, the BMB 414 may include circuitry for battery monitoring, including one or more of analog circuitry and digital circuitry. The BMB 414 may include processors, digital logic, programmable logic, transistors, resistors, capacitors, or other circuitry monitoring one or more cells.

In an example embodiment, a pair of enclosures for tabs 416 may form two exterior sides of the case 302. In an example embodiment, the enclosures for tabs 416 may be submerged. The submerged enclosure for tabs 416 may be adjacent to the current collectors 412 and may enclose the current collector 412, tab alignment plate 410, and a side of the cells 426. The submerged enclosure for tabs 416 may form a fluid tight seal that allows coolant, e.g., liquid coolant, to be contained and in contact with the tabs. In an example embodiment, an epoxy layer may be formed between the alignment plate and the cells, such that the coolant is in contact with the tabs and the current collectors, but not in contact with the cells. In some examples, a fluid, such as a refrigerant may go through a phase-change from liquid to gas. The phase-change, e.g., from liquid to gas, may occur within a battery pack to carry a greater amount of heat away from the cells 426 of the battery pack. The example including a phase-change is discussed in more detail with respect to FIGS. 7-9. The submerged enclosure for tabs 416 may allow for coolant to flow along the current collector 412, tab alignment plate 410, and a side of the cells 426 and away from the current collector 412, tab alignment plate 410, and a side of the cells 426 in order to carry heat away from those components and particularly the cells 426, e.g., by cooling the tabs of the cells 426. In one example embodiment, the system may be configured for active cooling of the tabs. This can be done, for example, by a pump that causes the cooling fluid to flow over the tabs. In this example embodiment, the cooling fluid can be pumped into the enclosure for tabs 416, through and out of the enclosure for tabs. In example embodiments, the cooling fluid can be pumped from a reservoir and returned to the reservoir after passing through the enclosure for tabs, and an external heating/cooling device can alter the temperature of the cooling fluid.

In an example embodiment, a plurality of pouch cells 428 are stacked side by side to form the cells 426. In an example embodiment, the cells 426 further include the thermally conductive but electrically isolated sheets such as the electrically isolated sheet 420, such a sheet may be a dielectrically coated graphite sheet. The cells 426 may also include the foam pad 422. For example, a pouch cell 428 may be located between the thermally conductive but electrically isolated sheet 420 and the foam pad 422. In other example embodiments, two or more pouch cells 428 may be located between the thermally conductive but electrically isolated sheet 420 and the foam pad 422 forming a sandwiched pouch cell unit. Thus, these sandwiched pouch cell units may be repeated through the stack of cells 426. Moreover, the pouch cell 428, electrically isolated sheet 420 and a foam pad 422 may be repeated every few cells 426 throughout the stack of cells. One example is illustrated with respect to FIG. 5E.

The thermally conductive but electrically isolated sheet 420, such as a dielectrically coated graphite sheet, may be located along an exterior side of the pouch cell 428. The thermally conductive but electrically isolated sheet 420 may be used to quickly conduct heat out from the exterior surface of pouch cell 428 that is in contact with sheet 420. In turn, electrically isolated sheet 420 may be cooled through a cold plate, such as one on top of top cover 402. Thus, in this example embodiment, each cell is cooled through external conductive heat transfer to a cold plate as well as through internal conduction to the tabs and heat transfer to the cooling liquid in the enclosure for tabs 416.

At either side of the cells 426, the foam pad 422 may be located adjacent to the pouch cell 428 and the side cover 424. For example, the foam pad 422 may be located adjacent to pouch cell 428 opposite the side having side cover 408. The foam pad 422 may allow reasonable expansion of the pouch cell 428 during operation, and to hold pouch cell 428 in place, together with the external side cover 424. The material and thickness may be determined through end of life (EOL) pouch cell 428 expansion criteria, e.g., which may usually allow 8-10% expansion EOL.

The side cover 424 may cover a side of the cells 426 opposite the side cover 408. The side cover 424 may have a number of subcomponents between the side cover 424 and the cells 426, including the foam pad 422, as described above. The side cover 424 may form part of the case 302.

In an example embodiment, the cells 426 may comprise any suitable number of pouch cells. For example, the more pouch cells, the greater the current and/or voltage of the battery pack 300. The pouch cells 428 may be stacked together in various arrangements. For example, in the illustrated embodiment of FIG. 4, the pouch cells 428 may be stacked side by side to form a pack of cells. Tabs from the pouch cells 428 may protrude from opposite sides of the individual cells of the pouch cells 428. In an example embodiment, the tabs are configured to carry electric current to and from the cells 426. For example, one tab of a pouch cell may be a positive electrical contact while another tab on an opposite side of the pouch cell may be a negative electrical contact. The electrical contacts may be connected to each other using current collectors 412. As discussed above, each current collector 412 may have an electrical connection to one or more tabs. A number of current collectors 412 may be configured to form series connections, parallel connections, or a combination of series connections and parallel connections between the pouch cells 428. Accordingly, different individual pouch cells 428 within the cells 426 may be oriented with different tab polarities along a given side of the cells 426. Combinations of various polarities, from having all the same polarities on the same sides of the cells 426 to having any combination of one of the polarities in one direction and the other polarity in the same direction are possible. For example, for a group of cells having four individual pouch cells, four pouch cells may have the positive polarity on a given side, e.g., 100% on a particular side. In another example, two pouch cells may have negative polarity on the given side and two pouch cells may have the positive polarity on the given side, e.g., 50%. It will be understood that the four-pouch cell example is only one example. The cells 426 may include many more, or even fewer pouch cells. The number of pouch cells selected and how such pouch cells are interconnected may be based on the current and voltage requirements for the intended use of the battery pack 300.

The set of bus bars 430 may be connected to the cells 426. For example, one bus bar 430 may be connected to a positive tab on a pouch cell of the group of pouch cells. The other bus bar 430 may be connected to a negative tab on a pouch cell of the group of pouch cells. The positive tab on a pouch cell of the group of pouch cells and the negative tab on a pouch cell of the group of pouch cells may be tabs having a desired charged voltage and providing a desired current based on the configuration of the current collectors 412. The bus bars 430 are illustrated along a side of the cells 426, however, the bus bars 430 may be located anywhere that allows for a connection to one or more current collector plates. Thus, a bus bar 430 may be electrically connected to all, or a subset of the pouch cells 428 for providing a power input/output point from the battery pack 300.

Figure 5A:
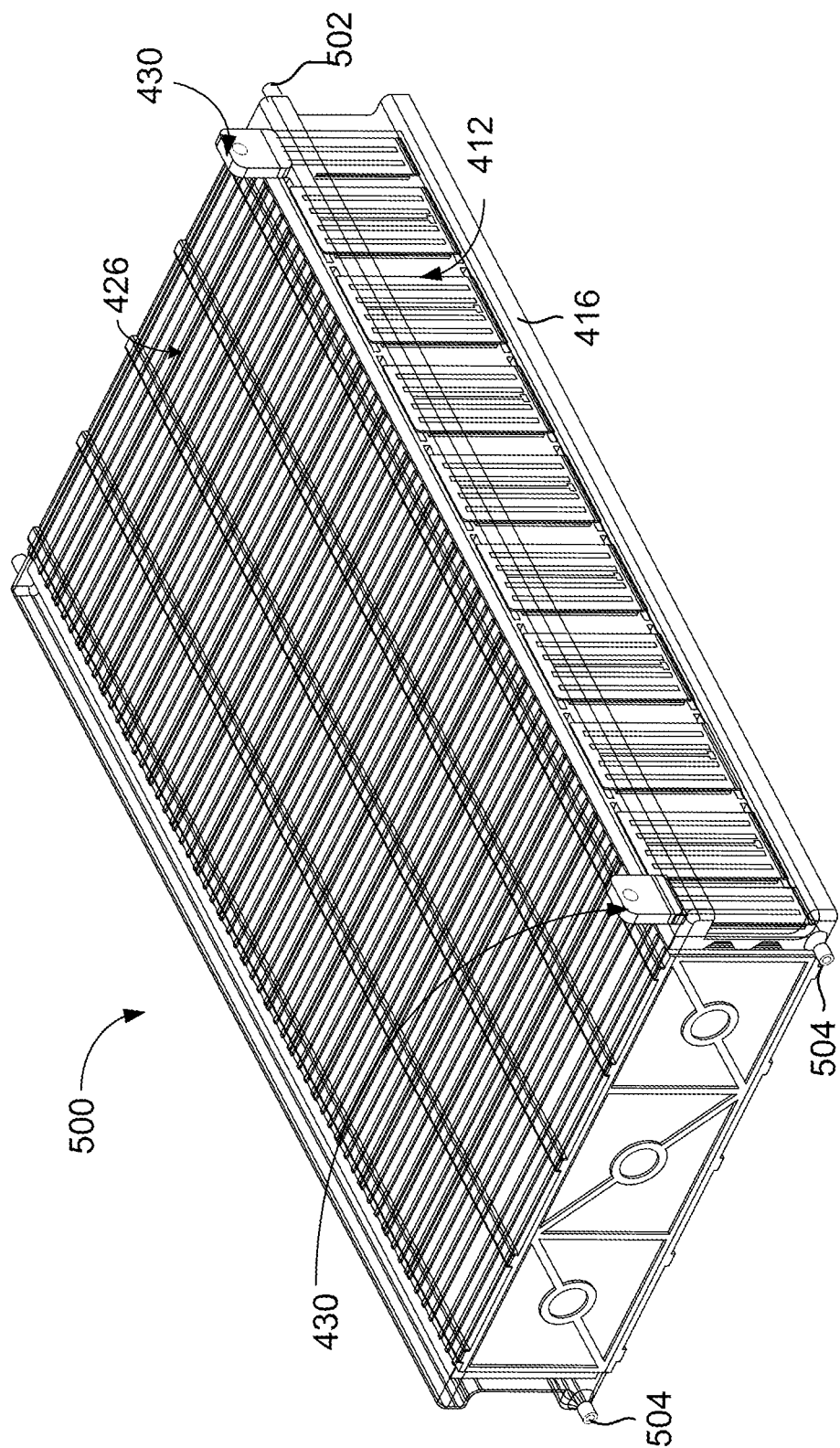
FIGS. 5A-5E are diagrams illustrating aspects of the example battery pack of FIGS. 3-4.

FIGS. 5A-5D are diagrams illustrating aspects of the example battery pack of FIGS. 3 and 4. FIG. 5A is generally similar to FIG. 3, but does not include the top cover 402 (FIG. 4). Accordingly, the cells 426 can be seen. The partially assembled battery pack 500 may also not show various components 402-408, 414, 418-424, 428. FIG. 5A generally illustrates component placement when the battery pack 300 (FIG. 3) is assembled. FIG. 5A illustrates a partially assembled battery pack 500 with the submerged enclosure for tabs 416 drawn in such a way that the current collectors 412 may be seen under the submerged enclosure for tabs 416. The submerged enclosure for tabs 416 may contain coolant that is in contact with the current collectors 412 and the tabs that may connect to the current collectors 412. Bus bars 430 are also illustrated in FIG. 5A. The battery pack 300 (e.g., assembled from the partially assembled battery pack 500 and other components) may include a coolant inlet 502 and a coolant outlet 504. The coolant inlet 502 and the coolant outlet 504 may be located in any suitable location. For example, a coolant inlet may exist at one side and a coolant outlet at the other side, preferably the inlet on the bottom, and the outlet on the top (of the different sides) for facilitating removal of entrained air. Furthermore, the coolant inlet 502 and the coolant outlet 504 could be located at other locations on the partially assembled battery pack 500, and accordingly, also on the battery pack 300. In an example embodiment, liquid coolant may flow in the coolant inlet 502. In an example embodiment, liquid coolant may flow out of the coolant outlet 504. Accordingly, a steady stream of liquid coolant may flow across the tabs to cool the cells. For example, liquid coolant may flow in the coolant inlet 502, across the tabs, and out of the coolant outlet 504. The coolant may carry heat from the tabs out of the battery pack 300 as the liquid coolant flows out of the coolant outlet 504. FIGS. 3-5D are principally for illustration of the liquid cooling embodiment. Two-phase cooling will be discussed with reference to FIGS. 7-9D.

Figure 5B:
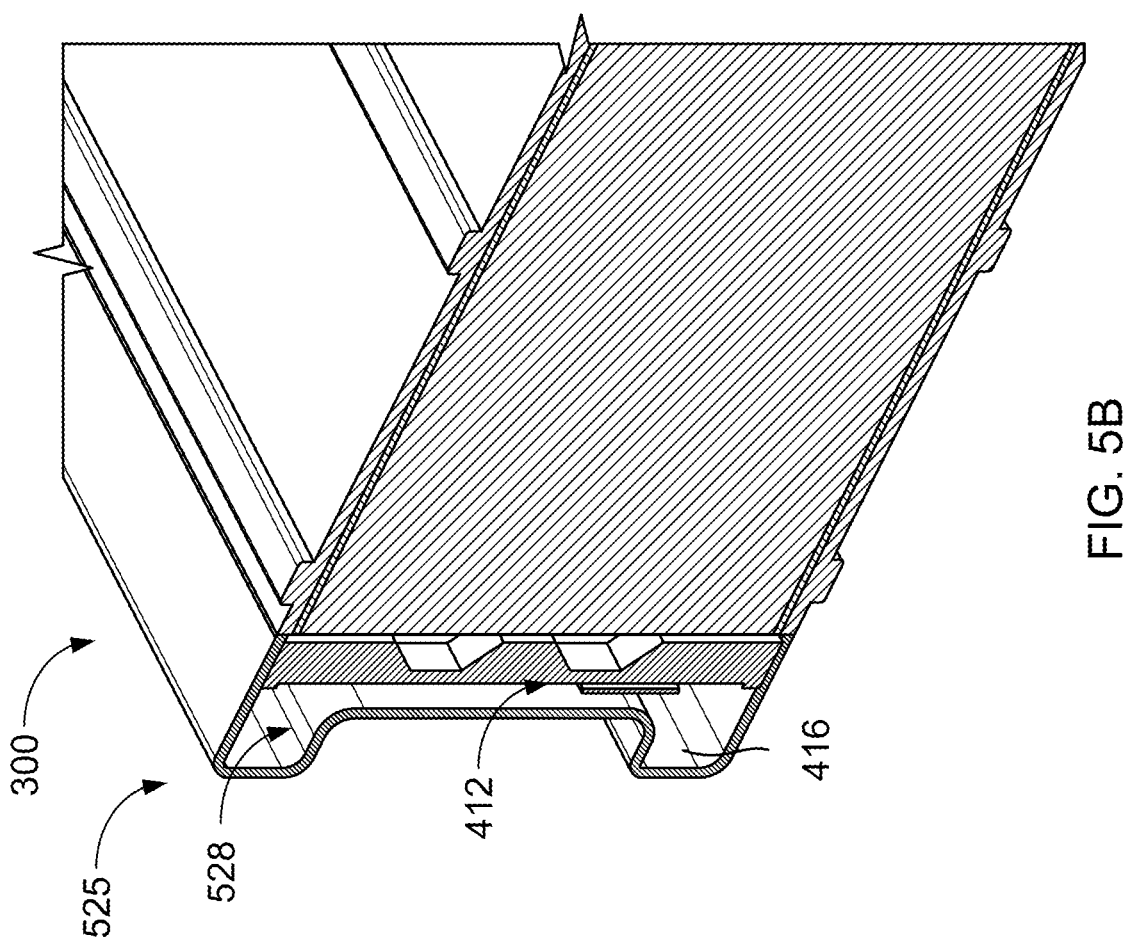

FIG. 5B is a diagram 525 that illustrates one possible arrangement of the submerged enclosure for tabs 416 that may allow coolant to cool the battery pack 300 of FIG. 3. FIG. 5B also illustrates a cutaway view of the battery pack 300. The cutaway view illustrates the chamber 528. Coolant may flow in chamber 528 and across the current collectors 412. Accordingly, the coolant may cool the current collectors 412 as well as other components connected to the current collectors 412, such as the cell tabs, which may carry heat from the cells.

Figure 5C:
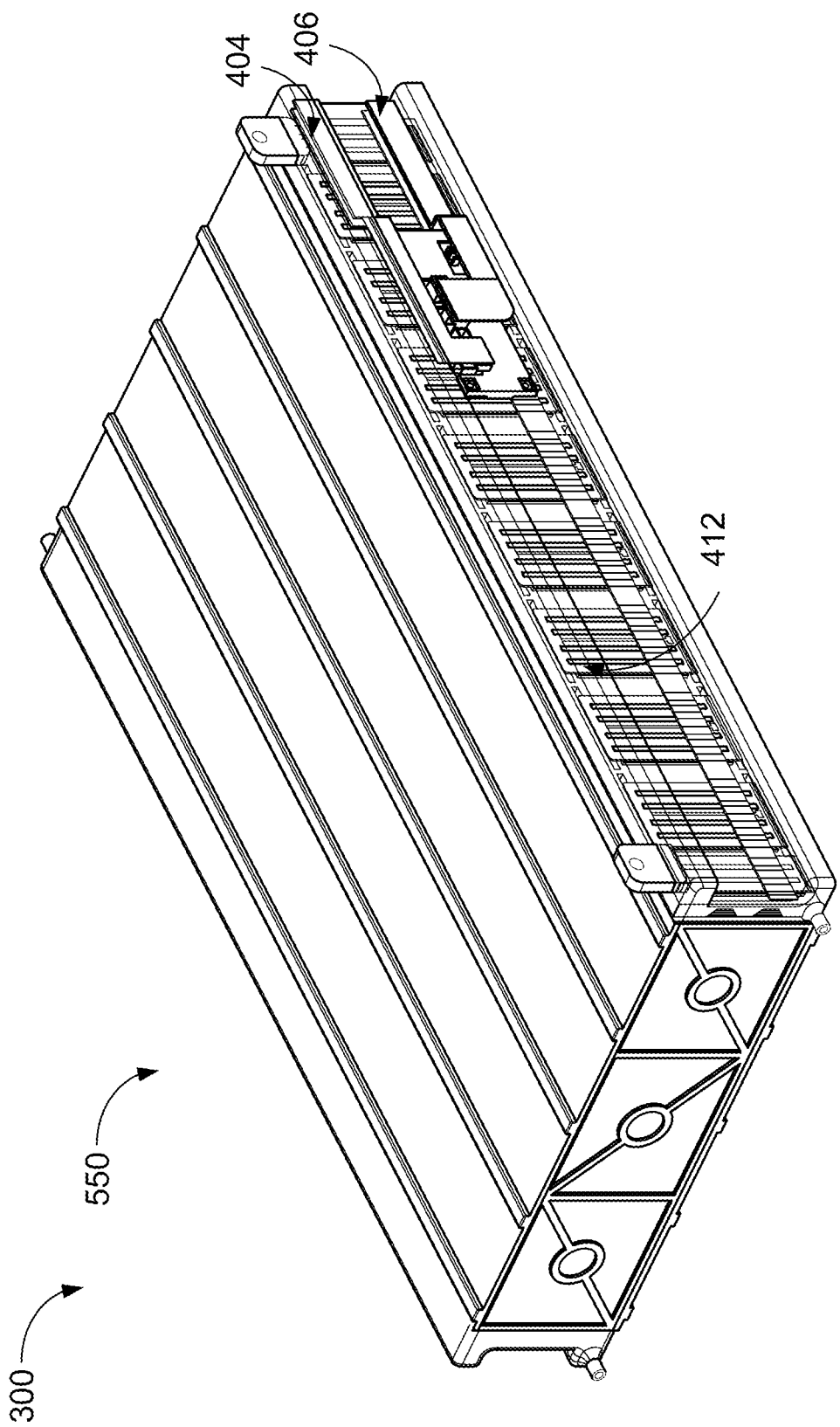

FIG. 5C is a diagram 550 generally similar to FIG. 3 and FIG. 5A. The temperature sensor 404 and the voltage sensor 406 are also illustrated. FIG. 5C generally illustrates component placement when the battery pack 300 (FIG. 3) is assembled. FIG. 5A illustrates a partially assembled battery pack 500 with the submerged enclosure for tabs 416 drawn in such a way that the current collectors 412 may also be seen under the submerged enclosure for tabs 416.

Figure 5D:
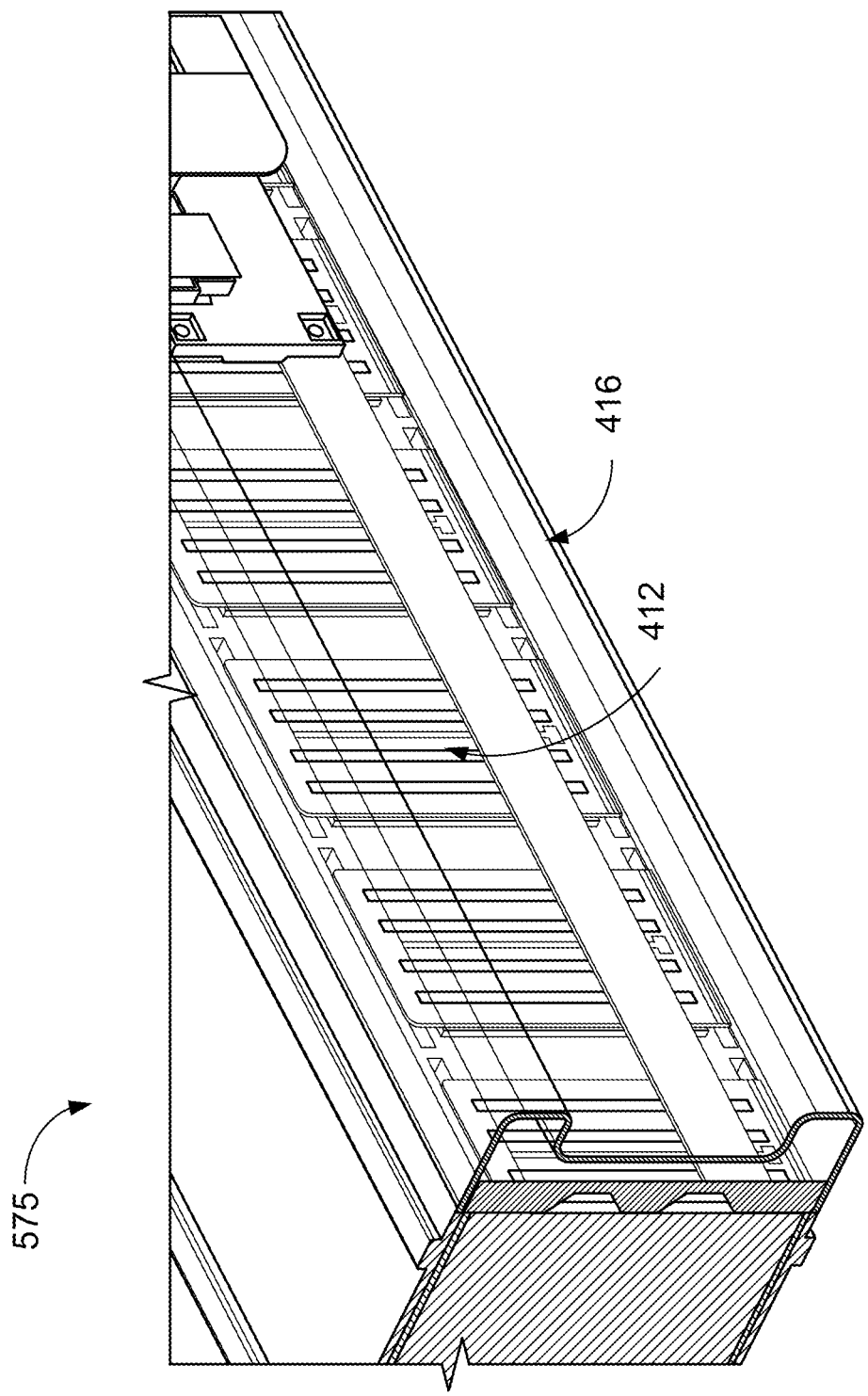

FIG. 5D is a diagram 575 providing a close-up view of aspects of the battery pack 300, including the submerged enclosure for tabs 416 and the current collectors 412. As discussed above, the submerged enclosure for tabs 416 may contain coolant that is in contact with the current collectors 412 and the tabs that may connect to the current collectors 412. FIG. 5D provides additional details, as the drawing is a closer view of these components.

Figure 5E:
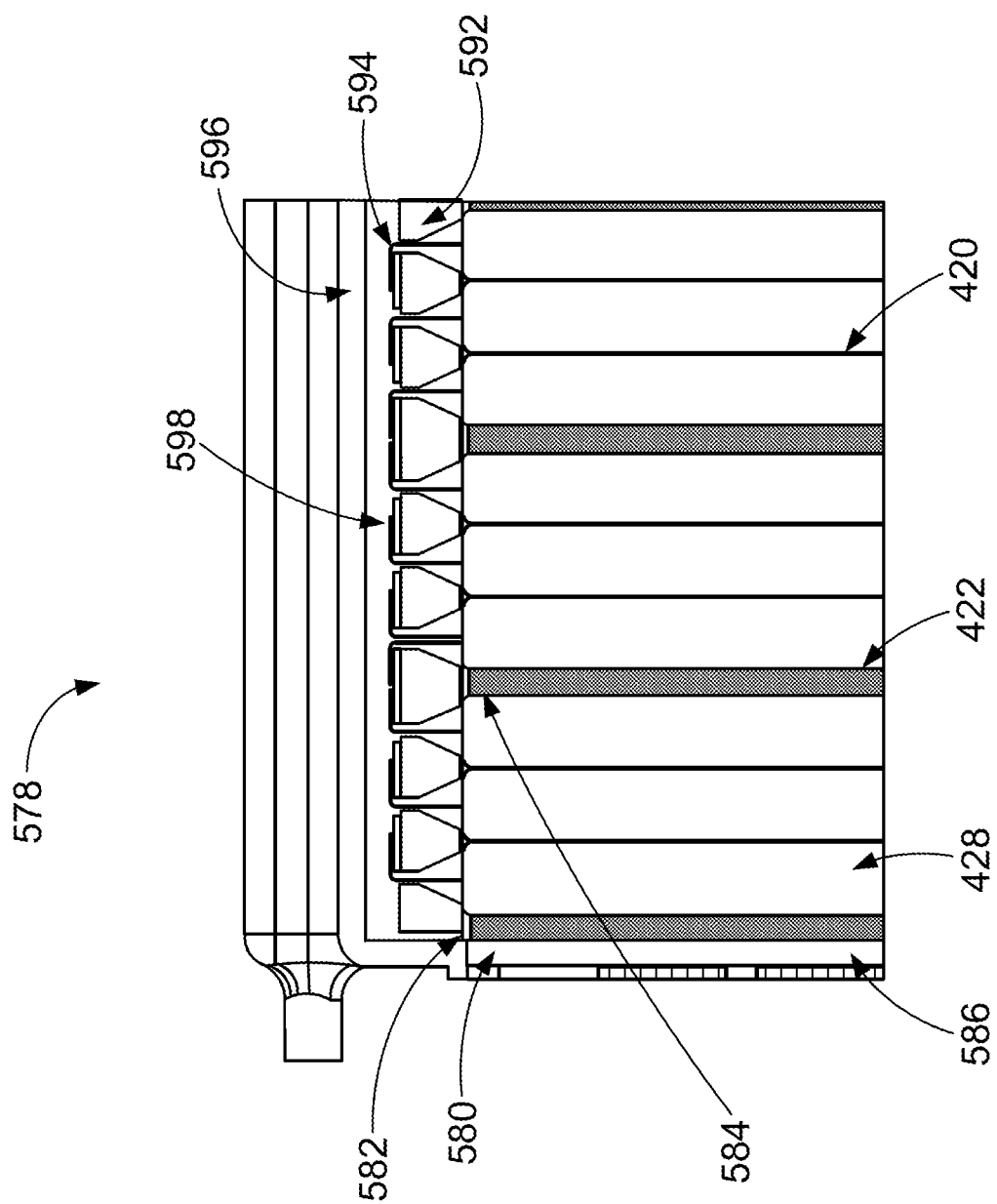

FIG. 5E is another diagram 578 providing a close up view of aspects of the battery pack 300, including stage 1 seal 580, stage 2 seal 582, epoxy covered area 584, module housing 586, pouch cell 428, foam pad 422, thermally conductive but electrically isolated sheet 420, tab organizer 592, current collector 594, coolant fluid housing 596, and cell terminal tabs 598. In the illustrated example of FIG. 5E, a foam pad 422 may be between each set of three pouch cells 428. Each pouch cell 428 may each be separated by a thermally conductive but electrically isolated sheet 420. A thermally conductive but electrically isolated sheet 420 may be between one side of a pouch cell 428 and a foam pad 422. The other side of the foam pad 422 may abut a pouch cell 428. In an example embodiment, the epoxy covered area 584 may help ensure that the foam pad 422 does not absorb coolant.

In an example embodiment, the stage 1 seal 580 may be a plastic weld between the module housing 586 and the coolant fluid housing 596. Accordingly, the module housing 586 and the coolant fluid housing 596 may form a sealed chamber for the coolant. The stage 2 seal 582 may be a sealant epoxy between the module housing 586 and the coolant fluid housing 596. Accordingly, coolant may be kept in a chamber with the cell terminal tabs 598. Accordingly, the cell terminal tabs 598 may be cooled by the fluid, which may, in turn, cool the pouch cell 428. The cell terminal tabs 598 may provide electrical connections to the cells. Accordingly, current collector 594 may be connected to the cell terminal tabs 598 to collect the current and provide the current to outputs of the cell. The cell terminal tabs 598 may be held by the tab organizer 592.

Figure 6:
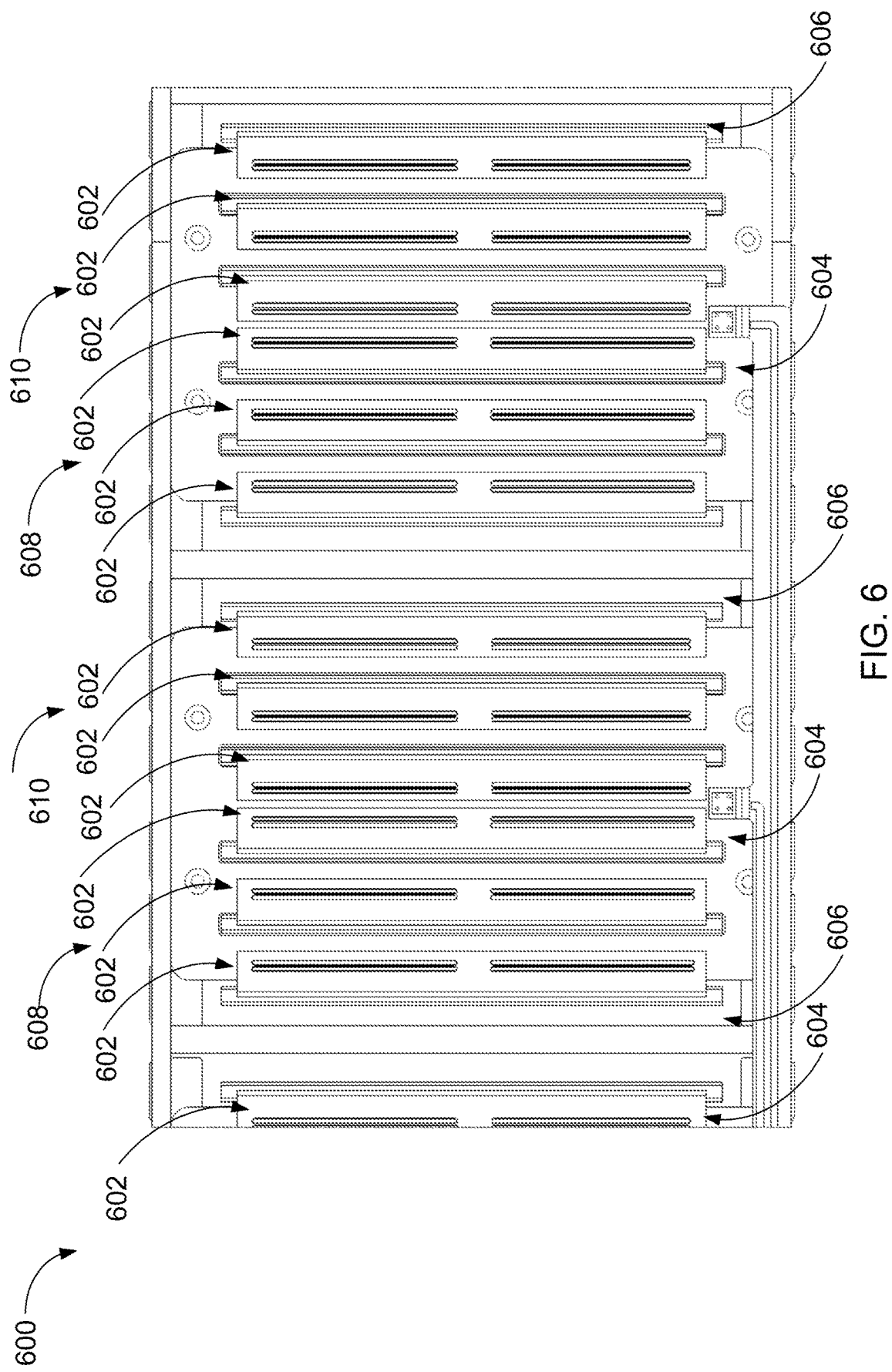
FIG. 6 is a diagram illustrating tab-based cooling in accordance with the systems and methods described herein.

FIG. 6 is a diagram illustrating tab-based cooling in accordance with the systems and methods described herein. FIG. 6 illustrates an end portion 600 of the cells having a number of tabs 602. Tabs 602 are in groups defined by collector plates 604. For example, the tabs 602 may be grouped into three positive tabs 608 and three negative tabs 610 per collector plate 604. The collector plates 604 may connect two or more pouch cells, via a tab of each pouch cell, to each other and to the bus bar. Each tab may be aligned by an alignment plate 606. In an embodiment, each current collector plate 604 of a pair of current collector plates 604 may be associated with one polarity, e.g., positive or negative. The other current collector plate 604 of the pair of current collector plates 604 may be associated with another polarity, e.g., negative or positive. Multipole sets of collector plates 604 may be used in a battery pack. Additionally, the connection points may connect to wiring that may carry current to devices powered by the battery pack. These connection points are also called busbars herein.

In an example, coolant may come into contact with both positive tabs and negative tabs. Various tabs of both polarities may be electrically connected to form the series connections and the parallel connections needed to generate the voltage and current the particular battery pack is designed for. However, in an example embodiment, not all tabs are connected together. Rather, the tabs may be connected in a specific way based on the particular design and the voltage and current design requirements. Accordingly, in some example embodiments, the coolant used does not conduct electricity. Otherwise, the coolant might short tabs together that are not intended to be shorted together.

Figure 7:
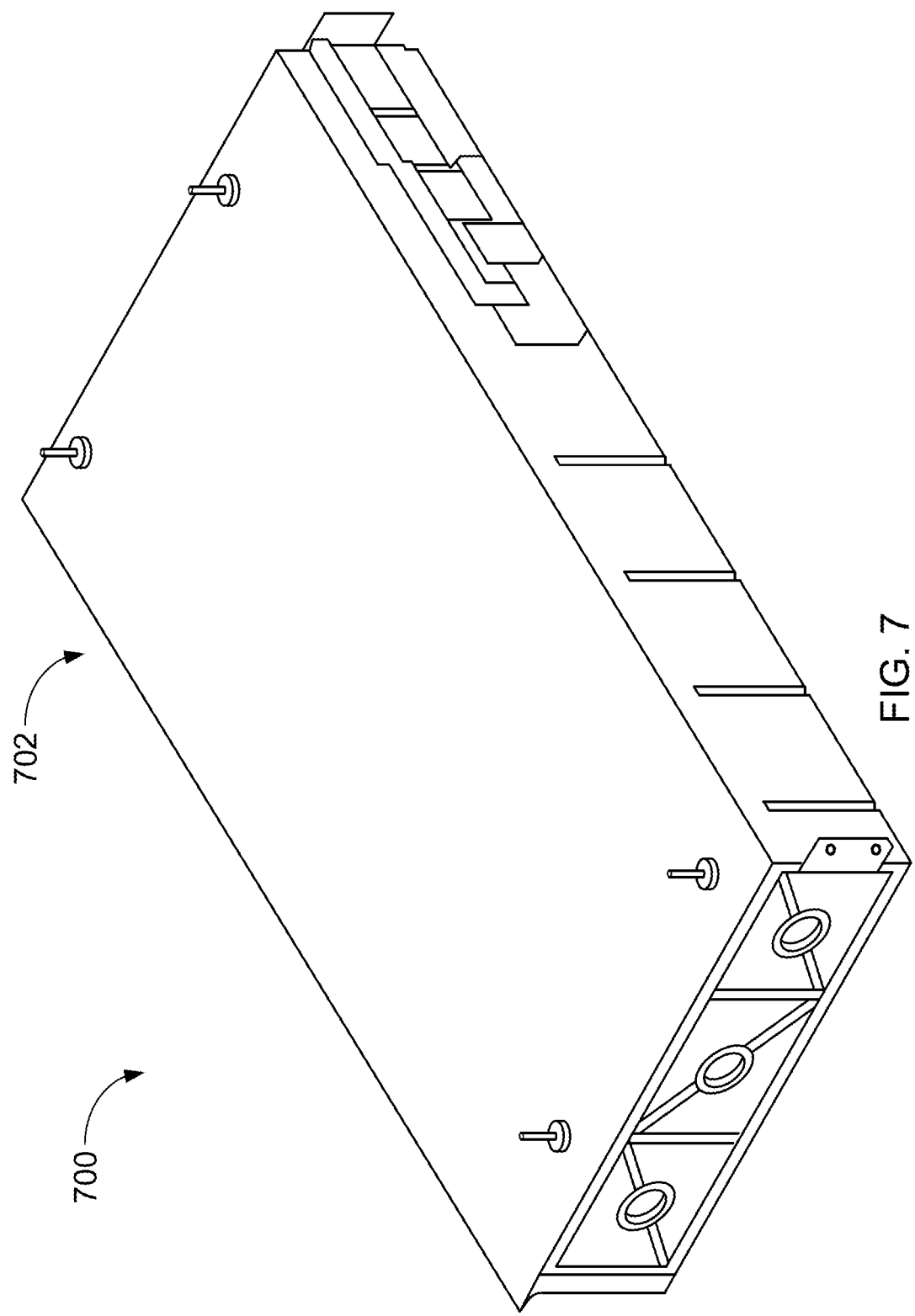
FIG. 7 is a diagram illustrating an example battery pack using vapor chamber cooling in accordance with the systems and methods described herein.
Figure 8:
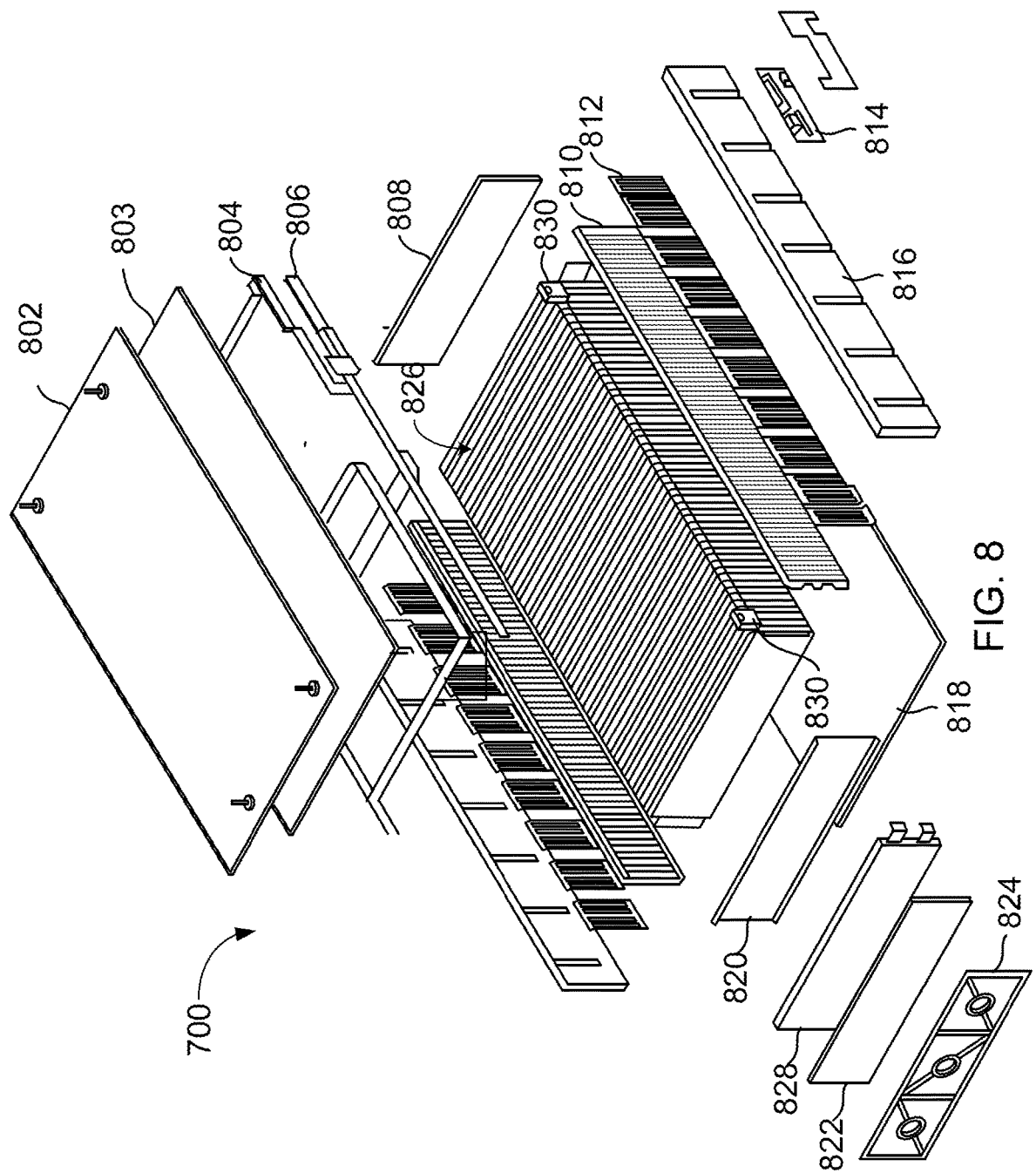
FIG. 8 is a diagram illustrating an exploded view of the example battery pack of FIG. 6.

FIG. 7 is a diagram illustrating an example battery pack 700 using vapor chamber cooling in accordance with the systems and methods described herein. In FIG. 7 the example battery pack 700 is assembled. In other words, the case 702 is sealed. FIG. 8 is a diagram illustrating an exploded view of the example battery pack 700 of FIG. 7. The example battery pack 700 includes a thin cold plate 802, a top cover 803, a temperature sensor 804, a voltage sensor 806, a side cover 808, a tab alignment plate 810, a current collector 812, a BMB 814, a vapor chamber enclosure for tabs 816, a bottom cover 818, a thermally conductive but electrically isolated sheet 820, a foam pad 822, a side cover 824, a number of cells 826, pouch cell 828, and a bus bar 830 FIGS. 7 and 8 are generally similar to FIGS. 3 and 4, respectively. For example, the example battery pack 700 is similar to the example battery pack 300. The case 702 is generally similar to the case 302, although different materials may be used as discussed below. The top cover 803, the temperature sensor 804, the voltage sensor 806, the side cover 808, the tab alignment plate 810, the current collector 812, the BMB 814, the vapor chamber enclosure for tabs 816, the bottom cover 818, the thermally conductive but electrically isolated sheet 820, the foam pad 822, the side cover 824, the number of cells 826, pouch cell 828, and the bus bar 830 may be similar to the top cover 402, the temperature sensor 404, the voltage sensor 406, the side cover 408, the tab alignment plate 410, the current collector 412, the BMB 414, the submerged enclosure for tabs 416, the bottom cover 418, the thermally conductive but electrically isolated sheet 420, the foam pad 422, the side cover 424, the number of cells 426, pouch cell 428, and the bus bar 430, respectively. In other words, components 8XX may generally be the same or similar to components 4XX, although various differences may exist as described herein and illustrated in the figures. For example, the vapor chamber enclosure for tabs 816 may be configured to work with two-phase, liquid-to-vapor or vapor-to-liquid, while the submerged enclosure for tabs 416 may be configured to work with liquids. Furthermore, the material used may vary from embodiment to embodiment, e.g., plastic for the examples using liquids and metal for examples using two-phase, liquid-to-vapor or vapor-to-liquid.

The diagram of FIG. 8 is generally similar to the diagram of FIG. 4. However, the diagram of FIG. 8 illustrates an example using a vapor chamber. In some embodiments, a battery pack using a vapor chamber may operate at higher pressure. In other embodiments, atmospheric pressure or lower, e.g., nearly vacuum, pressure may be used. The pressure used may be based on the liquid selected. By using a lower pressure, the liquid selected may be able to reach boiling point at a lower temperature. Pressure used and liquid used may be selected based on a desired boiling point for the system, which may be a desired temperature at which battery is cooled off by evaporation.

In an example embodiment, the battery pack may be tailored for different uses, whether the use of the battery pack is to power a vehicle for very aggressive drive/racing, or for a fast charge. The battery pack may be configured to set an optimal temperature for each use for better performance and longer cycle life. For example, the battery pack may be designed to remain at a temperature of 30-35° C. for optimal fast charge, which may reduce impedance and may avoiding causing the battery pack to reach lithium plating potential early. Maintaining such temperatures may allow the battery pack to achieve better cycle life and higher capacity charging per fast charge time without hitting constant voltage limit. In an example embodiment, tab cooling improves performance and cycle life of the battery. This is achieved in part by improving the homogeneity of the temperature distribution across the battery pack. The homogeneity of the temperature distribution is improved by providing a second heat sink path from the battery. This second heat sink path through the tabs may not only provide an additional path for sinking heat from the cells, but the second path may have significantly lower thermal resistance (higher thermal conductivity). For example, the thermal resistance per unit area through the sides of the cell to the cold plate can be greater than two times, or greater than 10 times, the thermal resistance through the tabs. Or stated another way, the thermal conductivity along the length of the cell may be much greater than the thermal conductivity through the cell width or depth. Although any suitable criteria for homogeneity may be selected, in one example embodiment, homogeneity of temperature across the cells may be less than five degrees C. temperature gradient.

The battery pack covers may be metal, such as aluminum, rather than plastic, in some examples. For example, the thin cold plate 802, the top cover 803, the side cover 808, the vapor chamber enclosure for tabs 816, the bottom cover 818, and the side cover 824 may be metal, e.g., aluminum. When a metal, e.g., aluminum, is used for the thin cold plate 802, the side cover 808, the vapor chamber enclosure for tabs 816, the bottom cover 818, and the side cover 824, the example battery pack 700 may be able to withstand pressures of a cooling vapor within the battery pack 700. However, any suitable material and construction technique may be used that can withstand the pressures of a cooling vapor within the battery pack 700. The vapor may be contained within the vapor chamber enclosure for tabs 816. In an example, the battery pack 700 may contain both liquid and vapor. Liquid may contact the tabs, e.g., within the tab alignment plate and be converted to vapor by heat from the tabs, thus cooling the tabs through latent heat of vaporization processes. Furthermore, the vapor may transfer heat to the cooling plate.

Figure 9A:
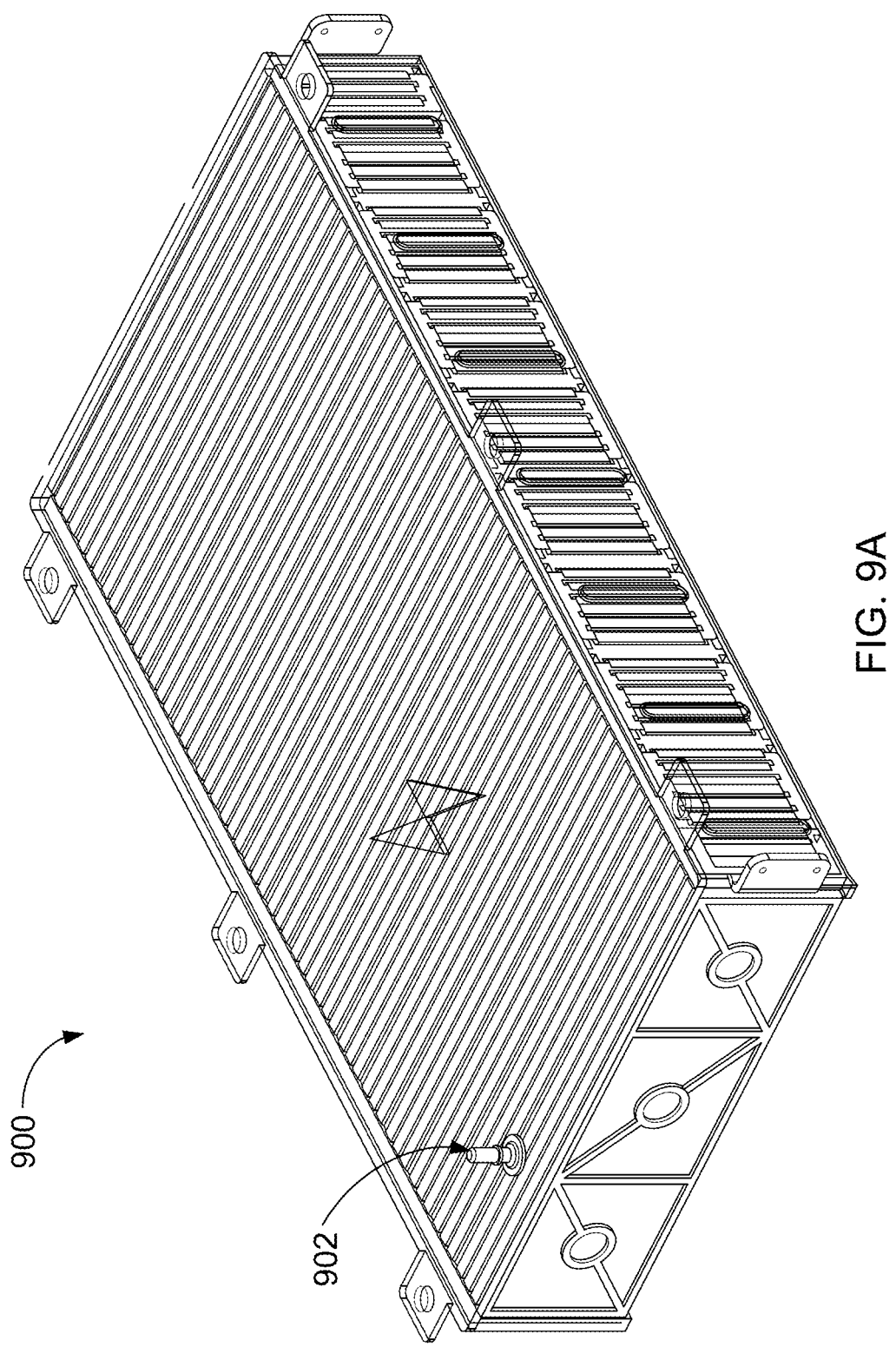
Figure 9C:
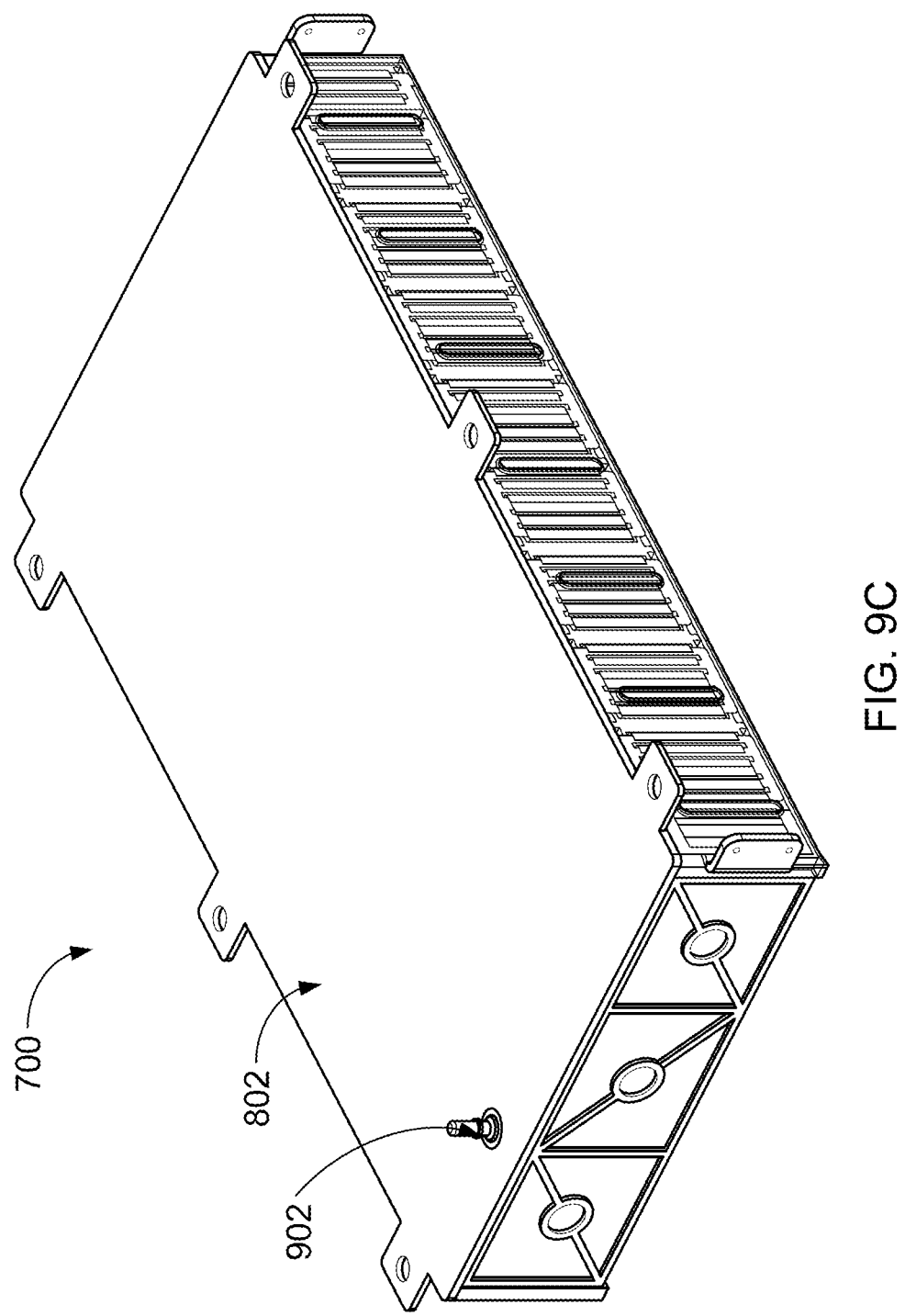
Figure 9D:
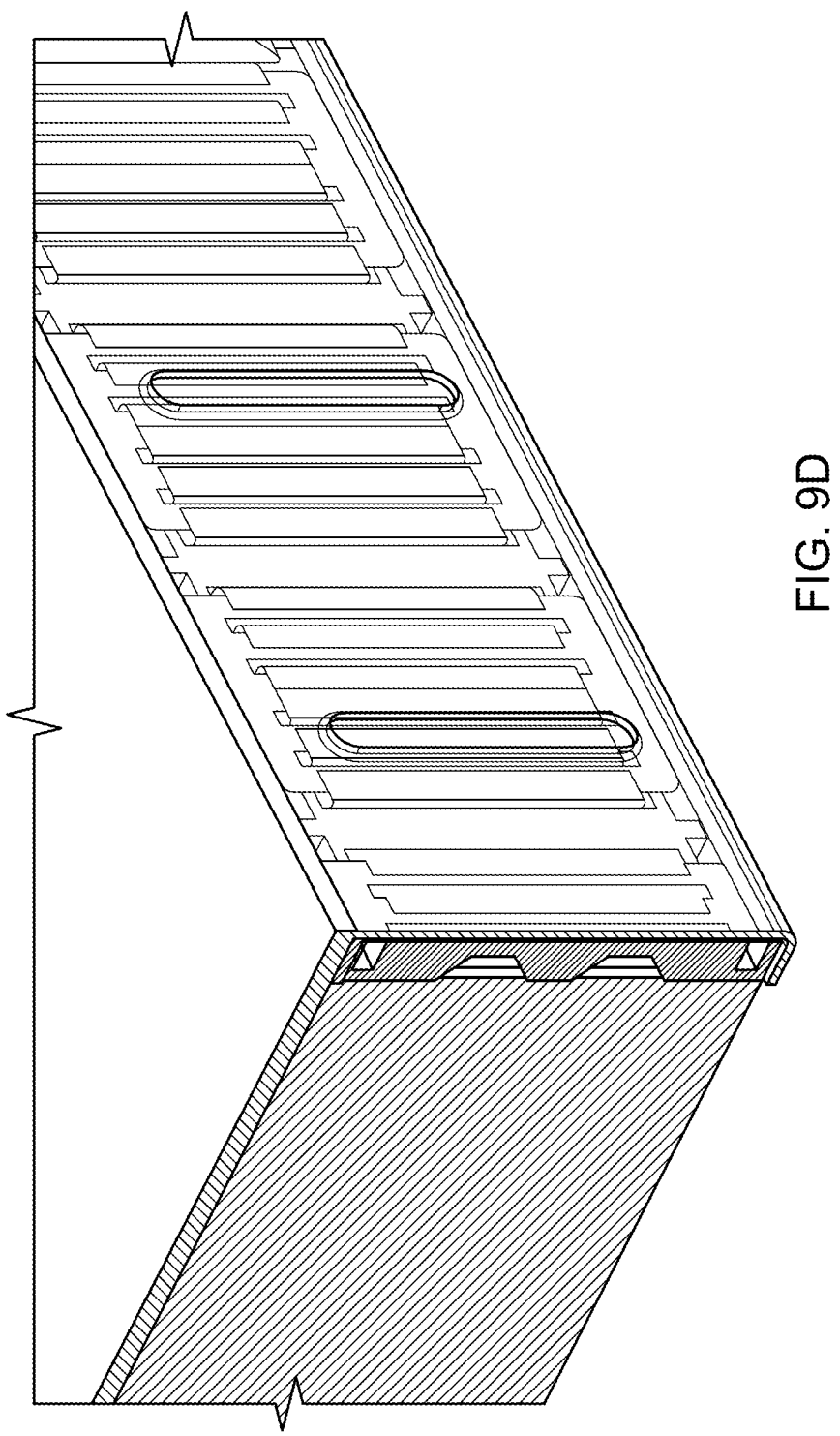

FIGS. 9A-9D are diagrams illustrating aspect of the example battery pack of FIGS. 7 and 8. FIGS. 9A-9D are generally similar to FIGS. 5A-5D. For example, FIG. 9A illustrates a partially assembled battery pack 900. For example, the partially assembled battery pack 900 may be missing various components 802-824, 828. FIG. 9B illustrates a cutaway view of the battery pack 700. (Battery pack 700 may include the partially assembled battery pack 900 and various other components to complete the battery pack 700.) FIG. 9C illustrates the partially assembled battery pack 900 and the thin cold plate 802 without various components 810-816. FIG. 9D provides additional details, as the drawing is a closer view of these components. FIGS. 9A-9D illustrate an example liquid cooling fluid that uses phase change to transfer the heat away from the tabs. For example, a liquid coolant may be added to the battery pack 900 through filling port 902. The filing port 902 may be sealed once the battery pack 900 is filled. In other words, battery pack 900 may be a closed system. In an embodiment, the vapor chamber enclosure may be completely sealed with one filling port each enclosure. The cold plate may be on top of the rest of the battery pack 900 and may be an independent unit that may be thermally conductive to the enclosure to help dissipate heat.

In an example embodiment, the enclosure may form a vapor chamber enclosure for tabs 816. The vapor chamber enclosure may have a filling port with appropriate dimensions (length and diameter) to be used to fill the vapor chamber with liquid. The filling port may serve as a balancing valve or buffer to limit the rate of rapid evaporation/balance out the pressure, thus helping avoid a potential dry-out condition and help sustain the rate of evaporation and condensation and thus help self-sustain the evaporation and condensation cycle.

In an example embodiment, a pressure relief valve and a pressure device may also be incorporated into the vapor chamber to dynamically control the pressure inside the enclosure. An example pressure device includes, but is not limited to a vacuum pump, e.g., to depressurize the enclosure for tabs 416, or a compressor, e.g., to pressurize the enclosure for tabs 416. In some examples, a pressure device is not used, e.g., when the chamber environment desired is at atmospheric pressure. In an example embodiment, both a vacuum pump and a compressor are operably connected to the enclosure for tabs 416, and may be configured to achieve a desired boiling point of the cooling fluid. Moreover, in another example embodiment, a dual pressure device with the ability to function as both a compressor and a vacuum pump may be used.

In an example, for cases such as parking in hot environments, (e.g., in an electrically powered vehicle having a battery in accordance with the systems and methods described herein), the vapor chamber may be pressurized, e.g., using a compressor, so that evaporation happens at a higher temperature. In another example, the vapor chamber may be de-pressurized, e.g., using a vacuum pump, allowing evaporation to occur at a lower temperature. The ability to change the boiling point by changing the pressure inside the tab enclosure provides a unique capability of setting up the target battery temperature based on load profile and ambient conditions. And in another example embodiment, the enclosure for tabs 416 can be heated via an internal heater or external heater to heat up the tabs when desired (tab heating), such as in very cold weather.

As discussed above, the pressure of the enclosure for tabs 416 may be adjusted to set a particular boiling point for a particular liquid used. Thus, in an example embodiment, battery packs using may be made of a thicker plastic, metal, or other suitable material capable of containing the desired designed for operating pressure. Generally, however, battery packs will be designed to operate with the enclosure for tabs at one atmosphere or low pressure.

Figure 10:
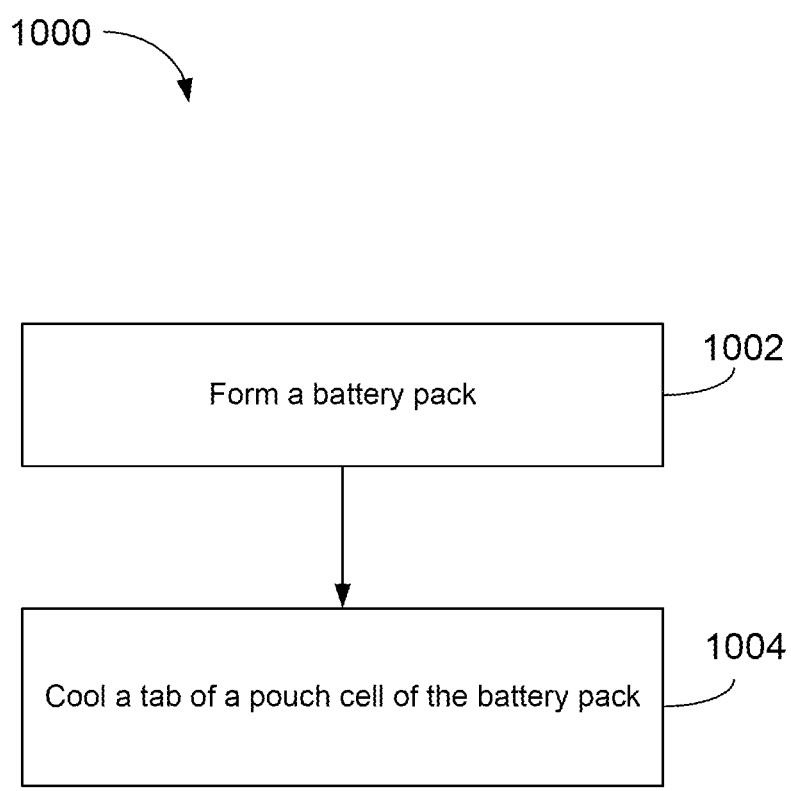
FIG. 10 is a flow diagram illustrating a method in accordance with the systems and methods described herein.

FIG. 10 is a flow diagram illustrating a method 1000 in accordance with the systems and methods described herein. The method may include manufacturing a pouch cell (1000) as described with respect to the systems and methods described herein and tab cooling such a pouch cell. Tab cooling may offer an efficient way to cool pouch cells. The tabs may perform multiple functions. For example, the tabs may carry electric current from a cell and may carry heat away from the cell.

The manufacturing method 1000 comprises: forming a battery pack (1002). The battery pack may include a cell (a pouch cell), a tab, coupled to the cell and configured to cool the cell, the tab submerged within a cooling material, and a chamber encapsulating the tab for holding the cooling material near the tab. In an example, the battery pack may further comprise a plastic tab enclosure enclosing the tab or an aluminum tab enclosure enclosing the tab.

The method 1000 further includes cooling a tab of the pouch cell of the battery pack (1004). Cooling the tab may include using a cooling material. The cooling material may provide a single-phase cooling. In an example, the cooling material may comprise a liquid, the method further comprising submerging the tab in the liquid. In another example, the cooling material may comprise a vapor. Cooling the tab 1004 may further comprise surrounding the tab with the vapor. In an example, cooling may include providing a two-phase cooling, including providing the cooling material in a liquid form and causing the cooling material to have a phase change to a vapor.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, a thermal connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A battery pack tab cooling system comprising:
   a pouch cell comprising a first tab and a second tab,
   a tab enclosure configured to contain a cooling material, wherein the first tab and the second tab extend from the pouch cell into the tab enclosure and are in contact with the cooling material;
   a tab alignment plate located between the pouch cell and the tab enclosure, wherein the first tab and the second tab extend through the tab alignment plate;
   a current collector located between the tab alignment plate and the tab enclosure;
   a filling port to add the cooling material to the tab enclosure; and
   a pressure relief valve and a pressure device to dynamically control the pressure inside the tab enclosure.

2. The battery pack tab cooling system of claim 1, wherein the cooling material provides a single-phase cooling of at least one of the first tab or the second tab.

3. The battery pack tab cooling system of claim 2, wherein the cooling material comprises a liquid submerging at least one of the first tab or the second tab.

4. The battery pack tab cooling system of claim 3, wherein the tab enclosure comprises at least one of plastic, metal, or metal alloy.

5. The battery pack tab cooling system of claim 1, wherein the filling port comprises an input port and an output port for filling the tab enclosure with the cooling material.

* * * * *